(12) United States Patent
Kinoshita et al.

(10) Patent No.: US 7,690,453 B2
(45) Date of Patent: Apr. 6, 2010

(54) ELECTRIC VEHICLE

(75) Inventors: Naoki Kinoshita, Saitama (JP); Hidetoshi Imaizumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 374 days.

(21) Appl. No.: 11/725,931

(22) Filed: Mar. 20, 2007

(65) Prior Publication Data
US 2007/0222413 A1 Sep. 27, 2007

(30) Foreign Application Priority Data
Mar. 22, 2006 (JP) .............................. 2006-078024

(51) Int. Cl.
*B60K 1/00* (2006.01)
(52) U.S. Cl. .................................................. 180/65.1
(58) Field of Classification Search .................. 180/65.1
See application file for complete search history.

(56) References Cited
U.S. PATENT DOCUMENTS

| | | | | |
|---|---|---|---|---|
| 6,536,547 B1 * | 3/2003 | Meaney, Jr. | ............... | 180/65.25 |
| 2001/0048226 A1 * | 12/2001 | Nada | ..................... | 290/40 C |
| 2003/0029654 A1 * | 2/2003 | Shimane et al. | ............ | 180/65.4 |
| 2005/0269981 A1 * | 12/2005 | Sakurai | ....................... | 318/139 |
| 2006/0012340 A1 * | 1/2006 | Saeki et al. | ................... | 320/132 |

FOREIGN PATENT DOCUMENTS

JP 2001-202980 7/2001

* cited by examiner

*Primary Examiner*—Paul N Dickson
*Assistant Examiner*—Erez Gurari
(74) *Attorney, Agent, or Firm*—Lahive & Cockfield, LLP; Anthony A. Laurentano

(57) ABSTRACT

An electric vehicle including a high-voltage power source at least including a first power source is provided. The electric vehicle further includes a low-voltage battery that is supplied with electric power from the high-voltage power source through a converter; an auxiliary vehicle controller for controlling a high-voltage contactor with electric power supplied from the high-voltage power source through the converter and/or with electric power supplied from the low-voltage; and an electric motor driving with electric power supplied from the high-voltage power source. The high-voltage contactor is connectedly provided between the high-voltage power source and the auxiliary vehicle controller, and the auxiliary vehicle controller controls the high-voltage contactor in such a manner that the electric power supply from the high-voltage power source is shut off if the electric power supply from the low-voltage battery to the auxiliary vehicle controller is cut off.

8 Claims, 4 Drawing Sheets

ELECTRIC VEHICLE

CROSS-REFERENCE TO RELATED APPLICATION

This application claims the foreign priority benefit under 35 U.S.C. §119 of Japanese Patent Application No. 2006-078024 filed on Mar. 22, 2006, the disclosure of which is incorporated herein by reference.

BACKGROUND OF THE INVENTION

1. Field of the Invention

The present invention relates to an electric vehicle provided with a high-voltage power source and a low-voltage battery.

2. Description of the Related Art

In general, an electric vehicle such as an EV (Electric Vehicle), a HEV (Hybrid Electric Vehicle) and an FCV (Fuel Cell Vehicle) is provided with a high-voltage battery for driving the vehicle and an assistant low-voltage battery (of 12V or so), as disclosed in JP2001-202980A, for example.

In a gasoline engine vehicle, an alternator supplies electric power to a low-voltage battery. On the other hand, in an electric vehicle, it is common that electric power is supplied from a high-voltage battery (high-voltage power source) to a low-voltage battery through a DC/DC converter. In such a power supply system, even if electric power supply from the low-voltage battery runs down or is shutdown, electric power supply from the high-voltage battery through the DC/DC converter is maintained, so that an electric control unit (ECU) and a system including a high-voltage system can be kept operating. Accordingly, the vehicle can be kept driving even though output from the low-voltage battery runs down or is shutdown during driving.

To the contrary, in a case in which the vehicle is in a still state with an ignition switch thereof "ON", in order to stop the electric power supply from the high-voltage power source by setting to be opened a contactor for a high-voltage system, which is controlled with the electric power supply from the low-voltage battery, it is required to stop both the electric power supplies from the high-voltage battery and the low-voltage battery.

In a conventional electric vehicle, in light of failing to switch off the ignition switch when disassembling the body or during a maintenance operation, it is required to shut down the electric power supplies both from the low-voltage battery and the high-voltage battery, along with an operation to confirm that both the electric power supplies are shutdown, which makes the operations more tedious.

Therefore, to solve the above difficulties, it would be desirable to provide an electric vehicle which facilitates operations of ensuring shutdown of electric power supplies both from a low-voltage power source and high-voltage battery and confirming the shutdown.

SUMMARY OF THE INVENTION

An aspect of the present invention provides an electric vehicle including a high-voltage power source at least including a first power source; a low-voltage battery that is supplied with electric power from the high-voltage power source through a converter; an auxiliary vehicle controller for controlling a high-voltage contactor with electric power supplied from the high-voltage power source through the converter and/or with electric power supplied from the low-voltage; and an electric motor driving with electric power supplied from the high-voltage power source. The high-voltage contactor is connectedly provided between the high-voltage power source and the auxiliary vehicle controller, and the auxiliary vehicle controller controls the high-voltage contactor in such a manner that the electric power supply from the high-voltage power source is shut off if the electric power supply from the low-voltage battery to the auxiliary vehicle controller is cut off.

Other features and advantages of the present invention will become more apparent from the following detailed description of the invention when taken in conjunction with the accompanying exemplary drawings.

DETAILED DESCRIPTION OF THE PREFERRED EMBODIMENTS

Hereinafter, with reference to attached drawings, descriptions will be provided on an embodiment of the present invention.

Figure 1:
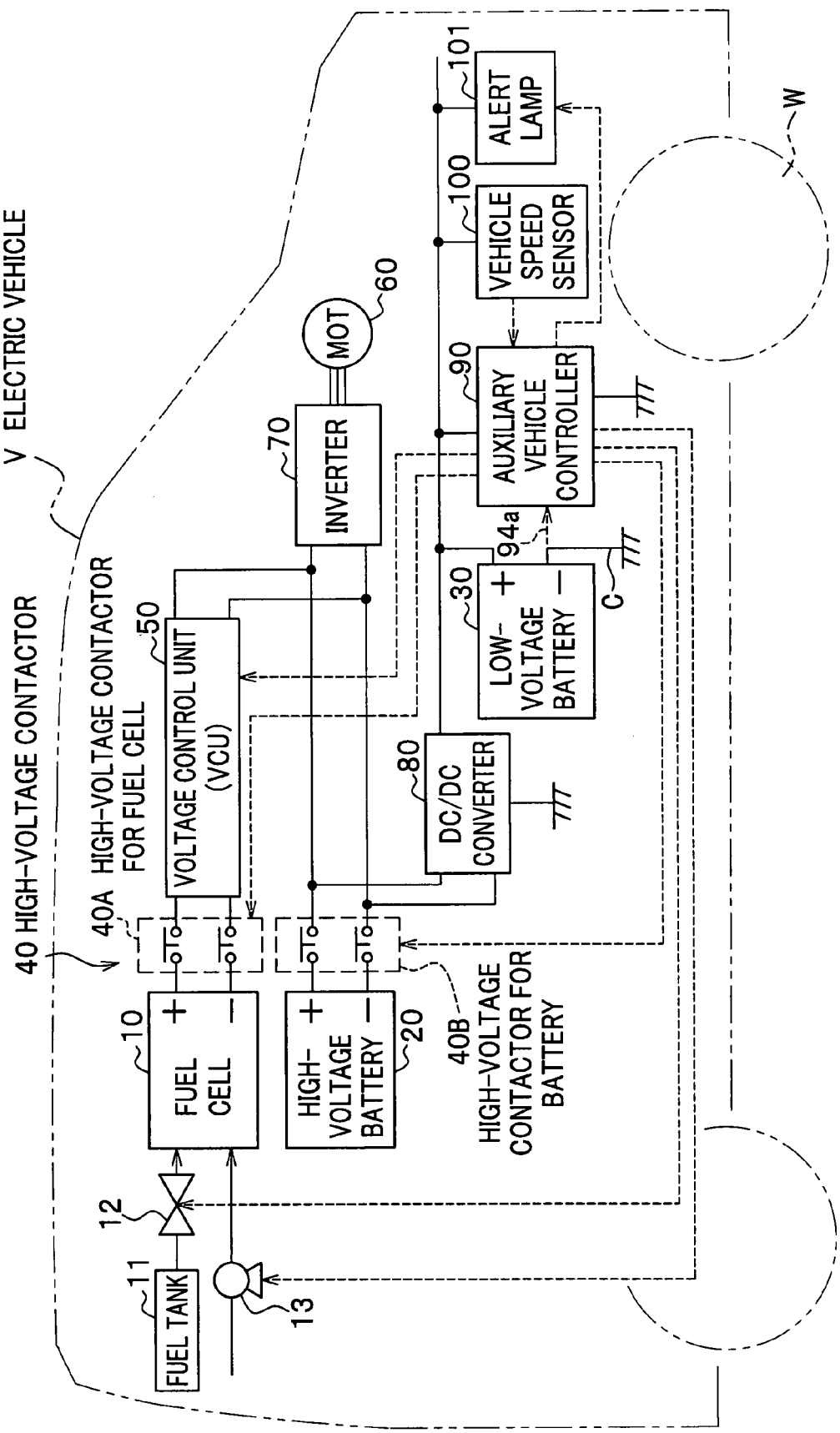
FIG. 1 is a schematic diagram showing an example of an electric vehicle according to an embodiment of the present invention.
Figure 2:
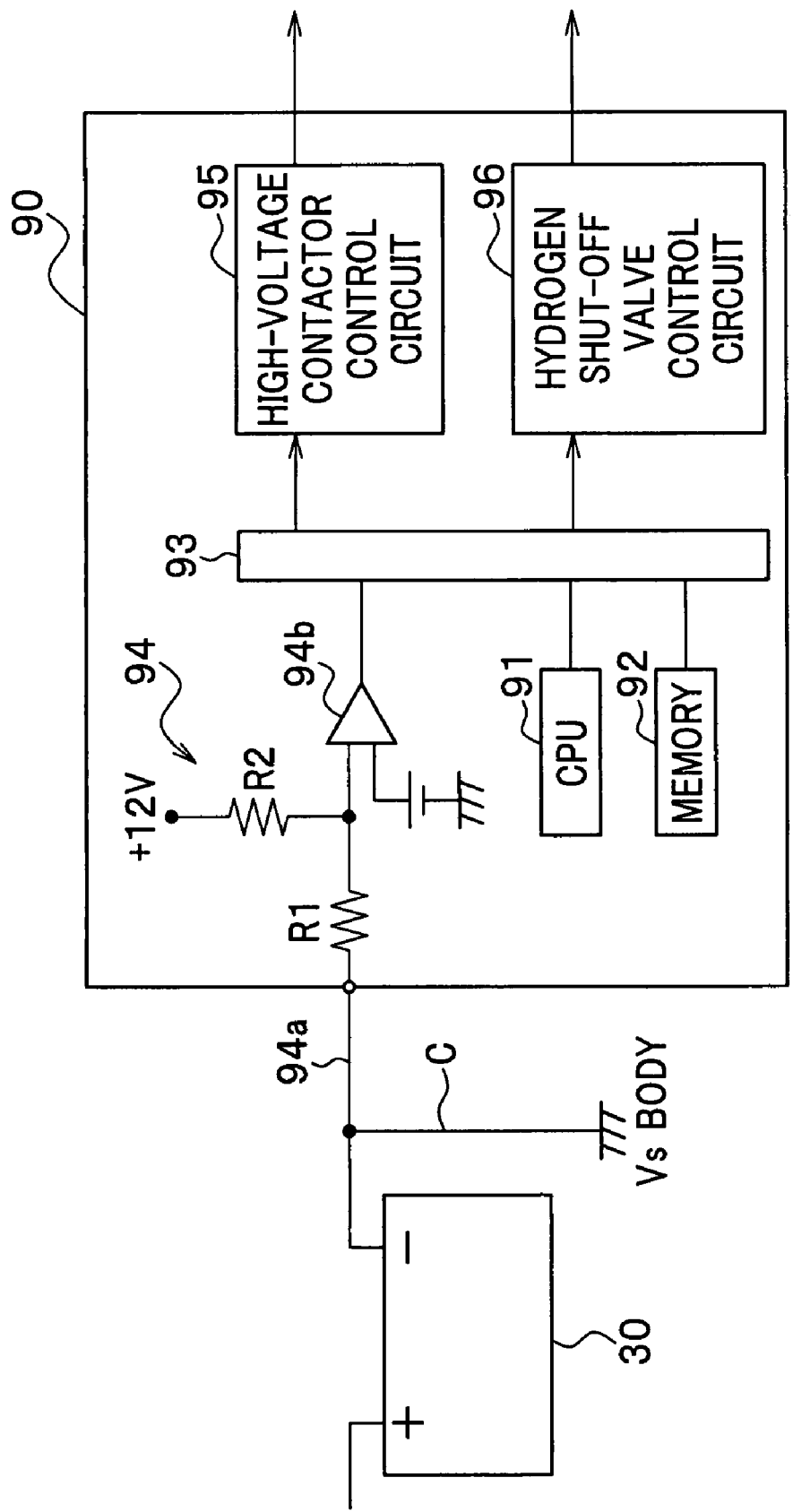
FIG. 2 is a circuit diagram of an auxiliary vehicle controller.
Figure 3:
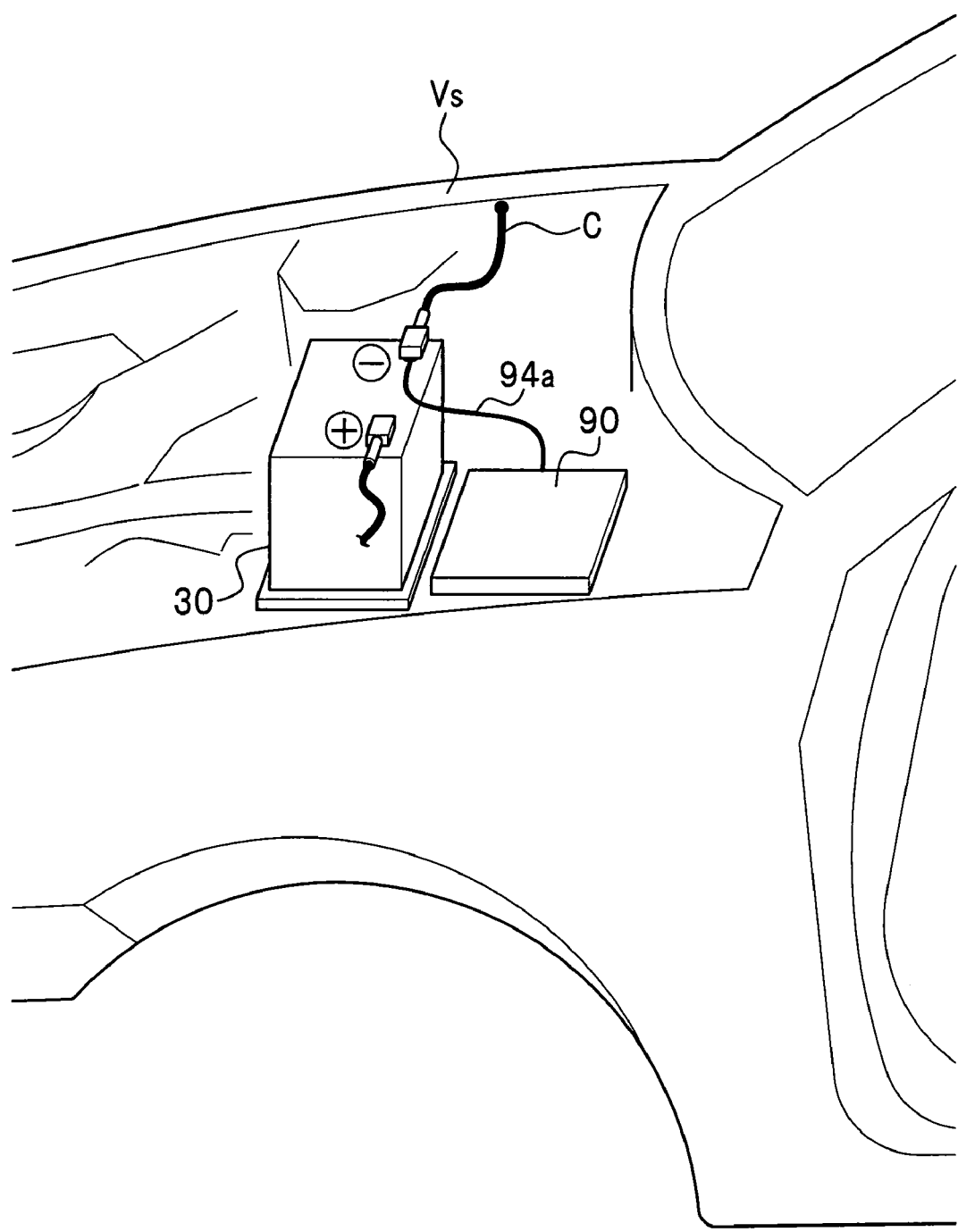
FIG. 3 is a perspective view showing a connection state between a low-voltage battery and an auxiliary vehicle controller.
Figure 4:
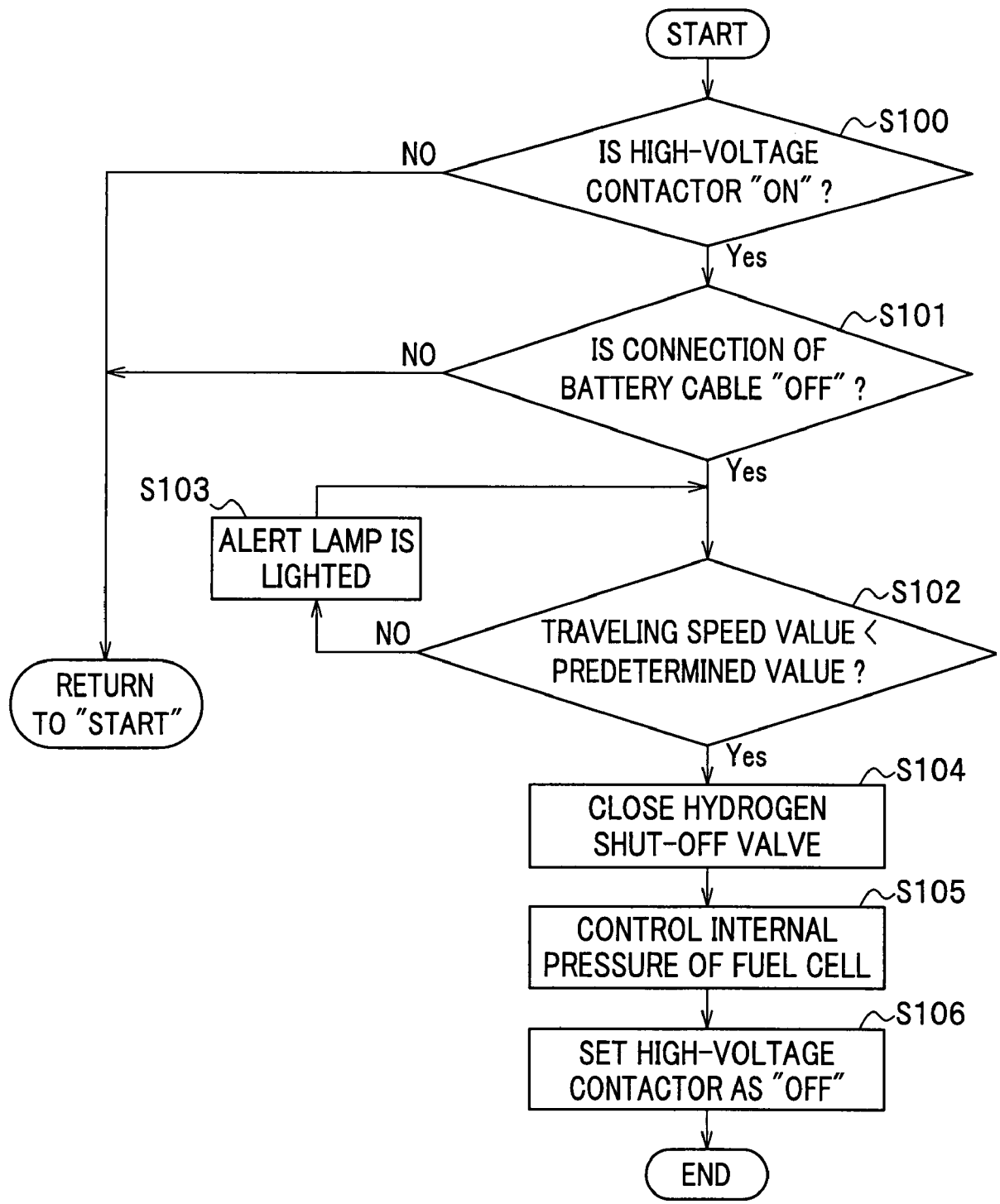
FIG. 4 is a flow chart showing a controlling operation by the auxiliary vehicle controller

FIG. 1 is a schematic diagram showing an example of an electric vehicle V according to the embodiment of the present invention. FIG. 2 is a circuit diagram of an auxiliary vehicle controller 90. FIG. 3 is a perspective view showing a connection status between a low-voltage battery 30 and the auxiliary vehicle controller 90. FIG. 4 is a flow chart showing a controlling operation performed by the auxiliary vehicle controller 90.

The electric vehicle V according to the present embodiment is what is called "fuel cell vehicle (FCV)", which includes a fuel cell 10, a high-voltage battery 20, a low-voltage battery 30, a high-voltage contactor 40, a voltage control unit (VCU) 50, an electric motor 60, an inverter 70, a DC/DC converter 80, the auxiliary vehicle controller 90, a vehicle speed sensor 100 and an alert lamp 101, and so on.

The fuel cell 10 is solid-macromolecular type, and is constituted by a plurality of stacked single cells, each of which is created in such a manner that a proton-conductive exchange membrane is sandwiched between an anode (fuel electrode) and a cathode (air electrode), both of which are further sandwiched by conductive separators. A fuel tank 11 charged with high purity hydrogen gas (hereinafter referred to as "hydrogen") is connected with an inlet of the anode of the fuel cell 10, and an air compressor 13 is connected with an inlet of the cathode thereof. The air compressor 13 serves for supplying to the fuel cell 10 compressed air taken from the atmosphere. Accordingly, hydrogen is supplied from the fuel tank 11 to the anode of the fuel cell 10 and the air is supplied from the compressor 13 to the cathode thereof, which causes an electrochemical reaction, thereby to generate electric power.

When the fuel cell 10 generates electric power, hydrogen ions generated by an action of catalyst on the anode permeate the proton-conductive exchange membrane into the cathode, and electrons move to the cathode through an external load applied from the electric motor 60 or the like. The action of catalyst on the cathode enhances generation of water due to reactions between hydrogen ions/electrodes and oxygen in the air.

The high-voltage battery 20 serves as an auxiliary power source of the fuel cell 10, which may be selected from a battery such as a lead-acid battery, a nickel hydrogen battery and a lithium ion battery.

The fuel cell 10 and the high-voltage battery 20 are connected in parallel, and also connected with the electric motor 60, respectively. In the example of the embodiment of the present invention, the fuel cell 10 and the high-voltage battery 20 constitute a high-voltage power source.

The low-voltage battery 30 may be, for example, a battery of 12V which serves for supplying electric power to electric apparatuses mounted on the electric vehicle V, and is connected with the fuel cell 10 and the high-voltage battery 20 through the DC/DC converter (described later). The low-voltage battery 30 may be constituted by a lead accumulator or the like, which is commonly used in a gasoline engine vehicle. A positive pole of the low-voltage battery 30 is connected with the auxiliary vehicle controller 90 and other components, and a negative pole thereof is connected with a (vehicle) body Vs of the electric vehicle V through a battery cable C, as shown in FIG. 3.

As shown in FIG. 1, the high-voltage contactor 40 includes a high-voltage contactor for fuel cell 40A connected with the fuel cell 10 and a high-voltage contactor for battery 40B connected with the high-voltage battery 20. The high-voltage contactor 40 serves as an electromagnetic switch for switching connections between the fuel cell 10 and the electric motor 60 and between the high-voltage battery 20 and the electric motor 60.

The voltage control unit (VCU) 50 serves for controlling generated currents (electric power) taken out of a high-voltage power source such as the fuel cell 10 in accordance with instructions on power generation sent from the auxiliary vehicle controller 90 (described later).

The electric motor 60 may be constituted by a permanent magnet type 3-phase AC synchronous motor, and serves for rotationally driving drive wheels W provided for the electric vehicle V.

The inverter 70 converts DC output from the fuel cell 10 and the high-voltage battery 20 into AC and supplies the AC for the electric motor 60, in accordance with instructions on torque specified for the voltage control unit 50, which is sent from the auxiliary vehicle controller 90.

The DC/DC converter 80 serves for converting a high voltage taken out of the fuel cell 10 and the high-voltage battery 20 into a low voltage of 12V compatible to the low-voltage battery 30.

As shown in FIG. 2, the auxiliary vehicle controller 90 includes a CPU 91, a memory 92, an I/O interface 93, a low-voltage battery connection detector 94, a high-voltage contactor control circuit 95, a hydrogen shut-off valve control circuit 96 and so on. One end of the auxiliary vehicle controller 90 is grounded, and the other thereof is connected with the DC/DC converter 80, the low-voltage battery 30, the vehicle speed sensor 100, and the alert lamp 101, etc. (see FIG. 1).

The memory 92 stores a determination value for setting the high-voltage contactor 40 as "ON (closed)" and a determination value for setting the contactor 40 as "OFF (opened)"

The low-voltage battery connection detector 94 includes a connection cable 94a, resistors R1, R2, and a comparator 94b and so on.

One end of the connection cable 94a is connected with an inner circuit of the auxiliary vehicle controller 90 and the other end thereof is connected with a terminal of the negative pole of the low-voltage battery 30 (see FIG. 3).

One end of the resistor R1 is connected with the connection cable 94a and the other thereof is connected with the I/O interface 93 through the comparator 94b. One end of the resistor R2 is connected with a point between the resistor R1 and the comparator 94b, and the other thereof is applied with a voltage of +12V.

The comparator 94b is a comparison circuit, and one end of an input side of the comparator 94b is applied with a predetermined voltage and the other end thereof is connected with the resistors R1, R2, and an output side of the comparator 94b is connected with the I/O interface 93.

The high-voltage contactor control circuit 95 serves for sending control signals to control a connection status of the high-voltage contactor 40, and is connected with the I/O interface 93.

The hydrogen shut-off valve control circuit 96 serves for sending control signals to control open/close of the hydrogen shut-off valve 12, and is connected with the I/O interface 93.

The vehicle speed sensor 100 serves for detecting a traveling speed of the electric vehicle V.

The alert lamp 101 is provided on a position where a driver of the electric vehicle V visibly notices that the lamp is lighted, so that the alert lamp 101 warns the driver by lighting the lamp when the connection between the battery cable C of the low-voltage battery 30 and the body Vs of the electric vehicle V becomes disconnected. The way of alerting the driver is not limited to using such a lamp, but the alert may be provided in speech form.

The auxiliary vehicle controller 90 is connected via a control line with those components such as the hydrogen shut-off valve 12, the air compressor 13, the high-voltage contactor for fuel cell 40A, the high-voltage contactor for battery 40B, the vehicle speed sensor 100 and the alert lamp 101. With the above configuration, the auxiliary vehicle controller 90 controls open/close of the hydrogen shut-off valve 12, rotation speed of the air compressor 13, open/close of the high-voltage contactor for fuel 40A and the high-voltage contactor for battery 40B, and "ON/OFF" of the alert lamp 101. The auxiliary vehicle controller 90 also receives information on vehicle traveling speed from the vehicle speed sensor 100.

Hereinafter, descriptions will be provided on operations of the electric vehicle V according to the present embodiment, with reference to FIG. 4 (see FIGS. 1 and 3 if necessary). First, the auxiliary vehicle controller 90 determines whether or not the high-voltage contactor 40 (the high-voltage contactor for fuel 40A and the high-voltage contactor for battery 40B) is "ON (closed)" at S100 of FIG. 4. At S100, if it is determined that the high-voltage contactor 40 is not "ON" ("No" at S100), the auxiliary vehicle controller 90 returns to "Start" and repeats the operation at S100.

At S100, if it is determined that the high-voltage contactor 40 is "ON" ("Yes" at S100), the auxiliary vehicle controller 90 proceeds to S101 and determines whether or not the connection of the battery cable C is "OFF". It should be noted that an expression "the connection state of the battery cable C is "OFF (disconnected)"" means herein that the connection between the low-voltage battery 30 and the body Vs (of the electric vehicle V) is disconnected for the following reasons: the battery cable C has come off from the body Vs or the terminal of the low-voltage battery 30; or an operator intentionally takes the cable C thereof for the purpose of disassembling or maintenance/checks; or the battery cable C itself is cut off, etc.

If the connection between the low-voltage battery 30 and the body Vs is disconnected, in the auxiliary vehicle controller 90 as shown in FIG. 2, a voltage of +12V is applied on the resistor R2 and then is input to the comparator 94*b*, so that signals corresponding to the input voltage of 12V is output through the comparator 94*b* to the I/O interface 93. The CPU 91 of the auxiliary vehicle controller 90 compares the signal output from the comparator 94*b* with the determination value previously stored on the memory 92, and generates a signal for setting the high-voltage contactor 40 as "OFF" and send the signal to the high-voltage contactor control circuit 95.

If the connection between the low-voltage battery 30 and the body Vs is connected in a normal state, a voltage based on a resistance ratio between the resistor R1 and the resistor R2 is input to the comparator 94*b*, and a signal corresponding to the input voltage based on the resistance ratio is output through the comparator 94*b* to the I/O interface 93. The CPU 91 of the auxiliary vehicle controller 90 compares the signal output from the comparator 94*b* with the determination values previously stored on the memory 92, and generates the signal for setting the high-voltage contactor 40 as "ON" and send the signal to the high-voltage contactor control circuit 95.

At S101, if it is determined that the connection of the battery cable C is not "OFF" ("No" at S101), that is, the battery cable C is connected with the body Vs in a normal state, the auxiliary vehicle controller 90 returns to "Start" and repeats the operation at S100.

At S101, if it is determined that the connection of the battery cable C is "OFF" ("Yes" at S101), the auxiliary vehicle controller 90 proceeds to S102, without setting the high-voltage contactor 40 as "OFF". At S102, the auxiliary vehicle controller 90 determines whether or not the traveling speed value obtained from the vehicle speed sensor 100 is smaller than the predetermined value, and if it is determined that the traveling speed value is smaller than the predetermined value ("Yes" at S102), the auxiliary vehicle controller 90 determines that the value shows that the vehicle can be stopped immediately, and proceeds to S104 to close the hydrogen shut-off valve 13. Accordingly, the hydrogen supply from the fuel tank 11 to the fuel cell 10 is shut off, so that power generation at the fuel cell 10 is stopped. It should be noted that the "predetermined value" may be "0 km/h (still state)" or a low traveling speed value (low-speed state), and the "low-speed state" means a speed at which the electric vehicle V can be stopped immediately without causing any serious trouble.

Following the above steps, the auxiliary vehicle controller 90 proceeds to S105, so as to control the internal pressure of the fuel cell 10.

Even after the hydrogen shut-off valve 13 is closed, hydrogen still remains at a high pressure in the fuel cell 10. Therefore, if the air compressor 13 is stopped at the same time of the hydrogen shut-off, a significant difference in internal pressure exists between the anode and the cathode, which may cause a serious trouble in the fuel cell 10. This process at S105 is provided for preventing such a trouble in the fuel cell 10. The embodiment of the present invention provides an example of controlling a difference in internal pressure therebetween, where, after the hydrogen shut-off valve 13 is closed, the rotation speed of the motor of the air compressor 13 is gradually lowered to reduce the difference in pressure between the anode and the cathode, so that the internal pressure of the fuel cell 10 is appropriately controlled, whereby preventing the above mentioned trouble in the fuel cell 10.

Then, the auxiliary vehicle controller 90 proceeds to S106 so as to set the high-voltage contactor 40 (the high-voltage contactor for fuel cell 40A and the high-voltage contactor for battery 40B) as "OFF" through the high-voltage contactor control circuit 95. Accordingly, the electric power supplies from the fuel cell 10 and the high-voltage battery 20 are shut-off, respectively.

Now, if the auxiliary vehicle controller 90 determines at S102 that the traveling speed value equals to the predetermined value or more ("No" at S102), the auxiliary vehicle controller 90 determines that the electric vehicle V is in a driving state, and then proceeds to S103, at which the alert lamp 101 is lighted to warn the driver of a disconnection between the low-voltage battery 30 and the body Vs. At this step, the alert lamp 101 is kept on until the traveling speed value becomes smaller than the predetermined value ("Yes" at S102).

According to the embodiment of the present invention, even in a case in which the electric vehicle V is in a still state with the ignition switch "ON", for example, because the operator forgot switching off the ignition switch when disassembling or doing a maintenance/check operation on the vehicle V, it is possible to disconnect the electric power supplies from the fuel cell 10 and the high-voltage battery 20 of the high-voltage system, simply by taking the battery cable C off the terminal of the low-voltage battery 30 or off the body Vs. Therefore, it is possible to eliminate conventional tedious operations of shutting off the electric power supplies from the fuel cell 10 and the high-voltage battery 20 and then confirming the shut-off of the electric power supplies.

According to the embodiment of the present invention, while the vehicle V is in a driving state, switching "ON" or "OFF" of the high-voltage contactor 40 is determined depending on the traveling speed of the vehicle V, whereby preventing such a trouble that the vehicle V suddenly stops when the electric power supplies from the fuel cell 10 and the high-voltage battery 20 are shut-off during the driving.

According to the embodiment of the present invention, the electric vehicle V is configured in such a manner that the high-voltage contactor 40 is connectedly provided between the electric motor 60 and the high-voltage power source; specifically, between the electric motor 60 and the fuel cell 10 serving as one high-voltage power source and also between the electric motor 60 and the high-voltage battery 20 serving as the other high-voltage power source, respectively. Accordingly, if the connection between the low-voltage battery 30 of 12V and the vehicle body Vs is disconnected, it is possible to shut-off the electric power supplies from the fuel cell 10 and the high-voltage battery 20 to the motor 60, so as to ensure the electric motor 60 to stop.

For example, in a case of an electric vehicle provided with a fuel cell such as the fuel cell 10 of the embodiment of the present invention, according to the embodiment of the present invention, it is possible to ensure the fuel cell 10 to stop the operation thereof by setting the high-voltage contactor 40 as "OFF" as well as closing the hydrogen shut-off valve 12.

For example, according to the embodiment of the present invention, in such a structure that the high-voltage power source (for example, the fuel cell 10 in FIG. 1) is connected through the VCU 50 with the electric motor 60, it is possible to shut off the electric power supply from the high-voltage power source by switching "OFF" the high-voltage contactor 40 in concert with cut-off of the electric power supply from the low-voltage battery 30, so as to prevent the VCU 50 from excessive voltage caused by the cut-off of the low-voltage battery 30, whereby protecting the VCU 50 and the electric motor 60.

The present invention is not limited to a case of a fuel cell vehicle (FCV), and may also be applicable to such a case of an electric vehicle (EV) including a hybrid electric vehicle (HEV). A capacitor including an electric double layer capacitor or an electrolytic capacitor or the like may be used as a high-voltage power source as a substitute for the high-voltage battery 20.

According to the present invention, it is possible to facilitate and ensure an operation of shutting off electric power supplies from a low-voltage battery and a high-voltage battery, as well as an operation of confirming the shut-off thereof.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. An electric vehicle comprising:
   a high-voltage power source at least including a first power source;
   a low-voltage battery that is supplied with electric power from the high-voltage power source through a converter;
   an auxiliary vehicle controller for controlling a high-voltage contactor with electric power supplied from the high-voltage power source through the converter or with electric power supplied from the low-voltage battery;
   the high-voltage contactor being connectedly provided between the high-voltage power source and the auxiliary vehicle controller;
   an electric motor driving with electric power supplied from the high-voltage power source,
   a vehicle speed sensor for detecting a traveling speed of the electric vehicle; and
   a low-voltage battery connection detector for detecting a connection state between the low-voltage battery and the electric vehicle,
   wherein
   using the electric power supplied from the high-voltage power source through the converter directly to the auxiliary vehicle controller, the auxiliary vehicle controller controls the high-voltage contactor in such a manner that the electric power supply from the high-voltage power source is shut off if:
   the electric power supply from the low-voltage battery to the auxiliary vehicle controller is cut off,
   the low-voltage battery connection detector detects a disconnection state between the low-voltage battery and the electric vehicle, and
   it is determined that the traveling speed value of the electric vehicle obtained on the vehicle speed shows at least that the vehicle is in a still state or in a low-speed state, and
   using the electric power supplied from the high-voltage power source through the converter directly to the auxiliary vehicle controller, the auxiliary vehicle controller further controls the high-voltage contactor in such a manner that the electric power supply from the high-voltage power source is not shut off if:
   the electric power supply from the low-voltage battery to the auxiliary vehicle controller is cut off,
   the low-voltage battery connection detector detects a disconnection state between the low-voltage battery and the electric vehicle, and
   it is determined that the traveling speed value of the electric vehicle obtained on the vehicle speed sensor shows at lest that the vehicle is not in a still state or in a low-speed state.

2. The electric vehicle according to claim 1, wherein the high-voltage contactor is connectedly provided between the high-voltage power source and the electric motor.

3. The electric vehicle according to claim 1, wherein
   the high-voltage power source at least includes a fuel cell that is supplied with fuel gas and oxidizer gas so as to generate electric power, as the first power source thereof,
   the fuel cell is connected with a fuel tank for supplying the fuel gas,
   a fuel gas shut-off valve is provided between the fuel cell and the fuel tank, and
   the auxiliary vehicle controller controls the fuel gas shut-off valve to shut off the fuel gas supplied from the fuel tank to the fuel cell if the electric power supplied from the low-voltage battery to the auxiliary vehicle controller is cut off.

4. The electric vehicle according to claim 2, wherein
   the high-voltage power source at least includes a fuel cell that is supplied with fuel gas and oxidizer gas so as to generate electric power, as the first power source thereof,
   the fuel cell is connected with a fuel tank for supplying the fuel gas,
   a fuel gas shut-off valve is provided between the fuel cell and the fuel tank, and
   the auxiliary vehicle controller controls the fuel gas shut-off valve to shut off the fuel gas supplied from the fuel tank to the fuel cell if the electric power supplied from the low-voltage battery to the auxiliary vehicle controller is cut off.

5. The electric vehicle according to claim 1, wherein
   the high-voltage power source further includes a high-voltage battery as a second power source that is a different power source from the first power source,
   the first power source and the second power source of the high-voltage power source are connected in parallel with the electric motor,
   a voltage control unit for controlling currents taken out of the high-voltage power source is connectedly provided between the high-voltage power source and the electric motor, and
   the auxiliary vehicle controller controls the high-voltage contactor to shut off the electric power supplied from the high-voltage power source including the second power source if the electric power supplied from the low-voltage battery to the auxiliary vehicle controller is cut off.

6. The electric vehicle according to claim 2, wherein
   the high-voltage power source further includes a high-voltage battery as a second power source that is a different power source from the first power source,
   the first power source and the second power source of the high-voltage power source are connected in parallel with the electric motor,
   a voltage control unit for controlling currents taken out of the high-voltage power source is connectedly provided between the high-voltage power source and the electric motor, and
   the auxiliary vehicle controller controls the high-voltage contactor to shut off the electric power supplied from the high-voltage power source including the second power source if the electric power supplied from the low-voltage battery to the auxiliary vehicle controller is cut off.

7. The electric vehicle according to claim 3, wherein
   the high-voltage power source further includes a high-voltage battery as a second power source that is a different power source from the first power source, the first power source and the second power source of the high-voltage power source are connected in parallel with the electric motor, a voltage control unit for controlling currents taken out of the high-voltage power source is connectedly provided between the high-voltage power source and the electric motor, and the auxiliary vehicle controller controls the high-voltage contactor to shut off the electric power supplied from the high-voltage power source including the second power source if the electric power supplied from the low-voltage battery to the auxiliary vehicle controller is cut off.

8. The electric vehicle according to claim 4, wherein the high-voltage power source further includes a high-voltage battery as a second power source that is a different power source from the first power source, the first power source and the second power source of the high-voltage power source are connected in parallel with the electric motor, a voltage control unit for controlling currents taken out of the high-voltage power source is connectedly provided between the high-voltage power source and the electric motor, and the auxiliary vehicle controller controls the high-voltage contactor to shut off the electric power supplied from the high-voltage power source including the second power source if the electric power supplied from the low-voltage battery to the auxiliary vehicle controller is cut off.

* * * * *